(No Model.)

C. L. HOLLAND.
SELF COUNTERSINKING SCREW HEAD.

No. 466,463. Patented Jan. 5, 1892.

Witnesses
Henry T. Smith
Inventor
Charles Levitt Holland,
By Thomas W. Holiday
his Attorney.

UNITED STATES PATENT OFFICE.

CHARLES LEVIETT HOLLAND, OF REVERE, MASSACHUSETTS.

SELF-COUNTERSINKING SCREW-HEAD.

SPECIFICATION forming part of Letters Patent No. 466,463, dated January 5, 1892.

Application filed March 23, 1891. Serial No. 386,117. (No model.)

*To all whom it may concern:*

Be it known that I, CHARLES LEVIETT HOLLAND, a citizen of the United States, and a resident of Revere, in the county of Suffolk, State of Massachusetts, have invented a new and useful Wood or Machine Self-Countersinking Screw-Head, which takes the place of a countersink-tool, of which the following is a specification.

My invention relates to wood and machine screw-heads that have to have an aperture made within the wood or metal by a countersink-tool to allow the aforesaid heads to become flush with or sunk beneath the surface of the material; and the objects of my invention are, first, to construct the aforesaid heads so as to cut their way within the material; second, to be so constructed that they will pass the chips or cuttings up the inclined planes of the cutters, respectively, leaving no material behind to cause abrasion; third, the cutters to have a slight curvature at their cutting-edges, or to simply conform to the pitch of the screw-heads; fourth, for screw-heads that do not penetrate beyond the surface of the material to have unbroken peripheries on the plane of the screw-heads, with the exception of the screw-driver slot; fifth, for screw-heads that do penetrate beyond the surface of the material to have openings on their peripheries, in connection with the cutters, to allow free egress of the chips or cuttings upward. These objects I attain by the mechanism illustrated in the accompanying drawings, in which—

Figure 1:
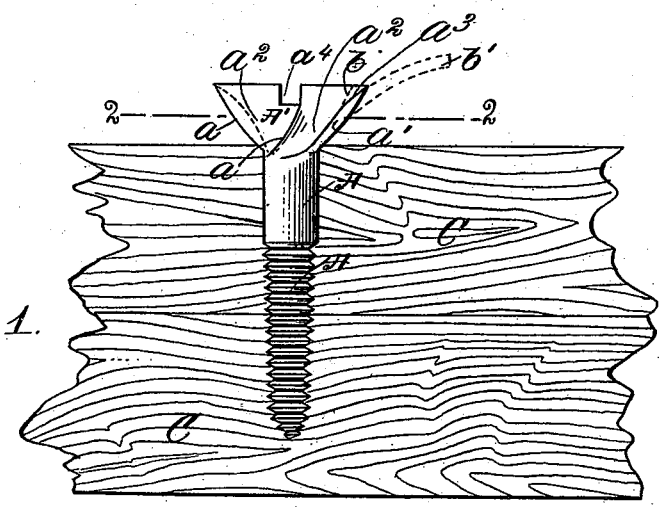
Figures 2, 3:
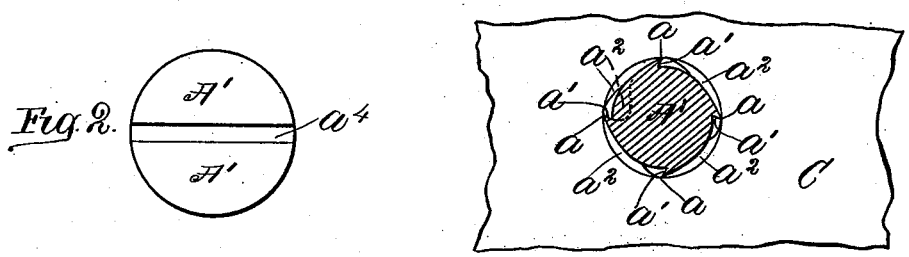
Figure 4:
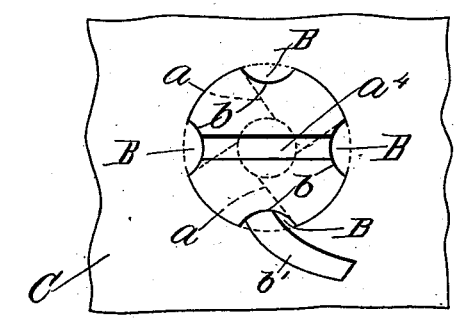

Figure 1 is a vertical view of a screw and its head, illustrating the cutters on said head about to countersink or cut their own way into the material. Fig. 2 represents a plan view of the screw-head, which is unbroken within its periphery, with the exception of the screw-driver slot. Fig. 3 is a plan section of the head on line 2 2, Fig. 1, illustrating the cutters and clearance therebetween. Fig. 4 is a plan view of screw-head, which has its periphery broken or recesses therein to allow free egress of the cuttings direct from the cutters when the screw and head travel beyond the surface of the material, and is a modification of Fig. 2.

Similar letters refer to similar parts throughout the several views.

A denotes the screw-shank, and A' its head, which has two or more inclined or straight cutters $a$ running from the plane of the head A' to its shank A, and which said cutters comprise the angular pitch of the screw-head, and, if necessary, can have a slight curved cutting-edge $a$, as illustrated on Fig. 1. $a'$ represents the face of the said cutters, and $a^2$ denotes the chip cavity or passage between said cutters in and on which the chips or cuttings recede when cut by the cutters $a$.

$a^3$ denotes the upper part of the cavity $a^2$, which acts as a cast-off on such a head, as shown in Fig. 2.

$a^4$ represents the screw-driver slot, and B denotes openings within the periphery of the screw-head, as shown in Fig. 4, through which the cuttings rise direct. This style of screw-head would be adapted for sinking the entire screw a depth within material—to wit, such as in wood-work—where the screw-head is hidden by a plug.

$b$ represents a parallel continuation of the cast-off line $a^3$ with the cutting-edge $a$, which makes the aperture B within the periphery of screw-head A', Fig. 4.

$b'$ denotes the chips or cuttings which rise from the cutters $a$.

C represents wood or any other material.

Having described my invention, I claim—

1. In a self-countersinking screw-head, the inclined or straight cutters $a$, chip-passages $a^2$, cast-off curvatures $a^3$, screw-driver slot $a^4$, all substantially as described, and for the purpose set forth.

2. In a self-countersinking screw-head, the inclined cutters $a$, having a slight curvature at its cutting-point, chip passages or cavities $a^2$, direct chip-passage $b$, and aperture B, substantially as described, and for the purpose set forth.

3. A self-countersinking screw-head provided with one or more inclined cutters having a slight curvature at its cutting-point and efficient clearance-channels for the chips or cuttings to recede therefrom, as set forth.

CHARLES LEVIETT HOLLAND.

Witnesses:
  THOMAS W. HOBDAY,
  HENRY T. SMITH.